United States Patent [19]

Zimmerly

[11] Patent Number: 5,226,449
[45] Date of Patent: Jul. 13, 1993

[54] MANIFOLDS AND COMPOUND VALVES WITH REMOVABLE VALVE ASSEMBLIES

[75] Inventor: Robert D. Zimmerly, Kenosha, Wis.

[73] Assignee: Tri-Clover, Inc., Kenosha, Wis.

[21] Appl. No.: 972,586

[22] Filed: Nov. 6, 1992

[51] Int. Cl.$^5$ .................................... F16K 11/00
[52] U.S. Cl. ................... 137/597; 137/240; 137/883
[58] Field of Search .............. 137/597, 883, 239, 240

[56] References Cited

U.S. PATENT DOCUMENTS

| 2,214,736 | 9/1940 | Carmichael et al. ........ 137/597 X |
| 3,464,447 | 9/1969 | Jones ................................ 137/883 |
| 4,412,150 | 12/1978 | Boisserand .................... 137/883 X |
| 4,757,834 | 7/1988 | Mieth . | |

FOREIGN PATENT DOCUMENTS 2346158  3/1975 Fed. Rep. of Germany ...... 137/883

Primary Examiner—John C. Fox
Attorney, Agent, or Firm—Ryan, Kees & Hohenfeldt

[57] ABSTRACT

A flow control manifold assembly, constructed of a number of manifold valve assemblies. Each manifold valve assembly is formed of a single valve body that has two or three valve chambers. Each chamber is fitted with an inexpensive single actuator valve assembly. The valve chambers are connected together in fluid communication with each other at their lower ends. A bonnet is affixed to each actuator, and projects into its valve chamber and removably carries the valve stem which carries a valve plug. Each valve assembly is thus independently removable from the valve housing while the other two valve assemblies remain in place, thus providing a means to prevent unwanted loss or mixing of fluids in the system.

8 Claims, 5 Drawing Sheets

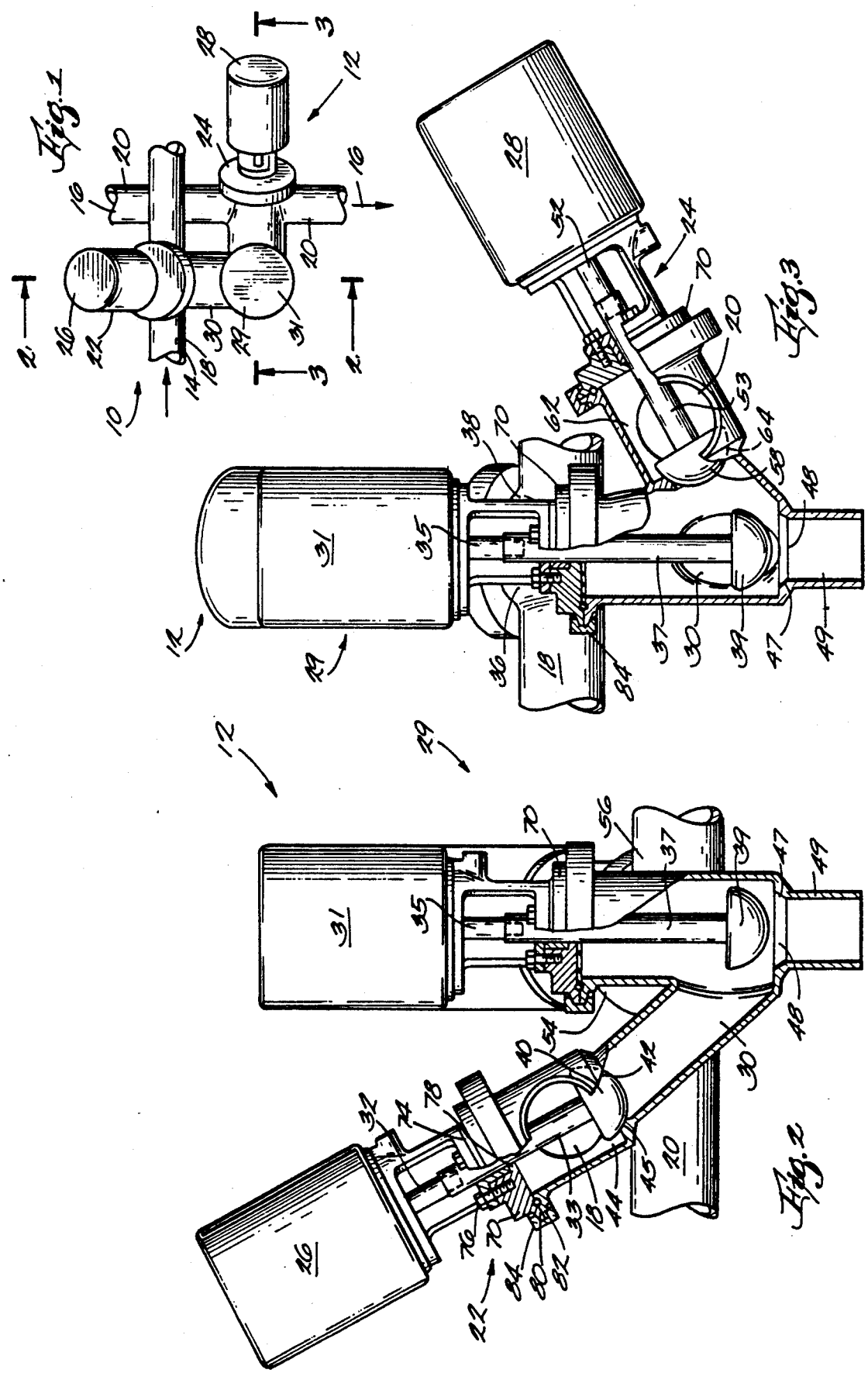

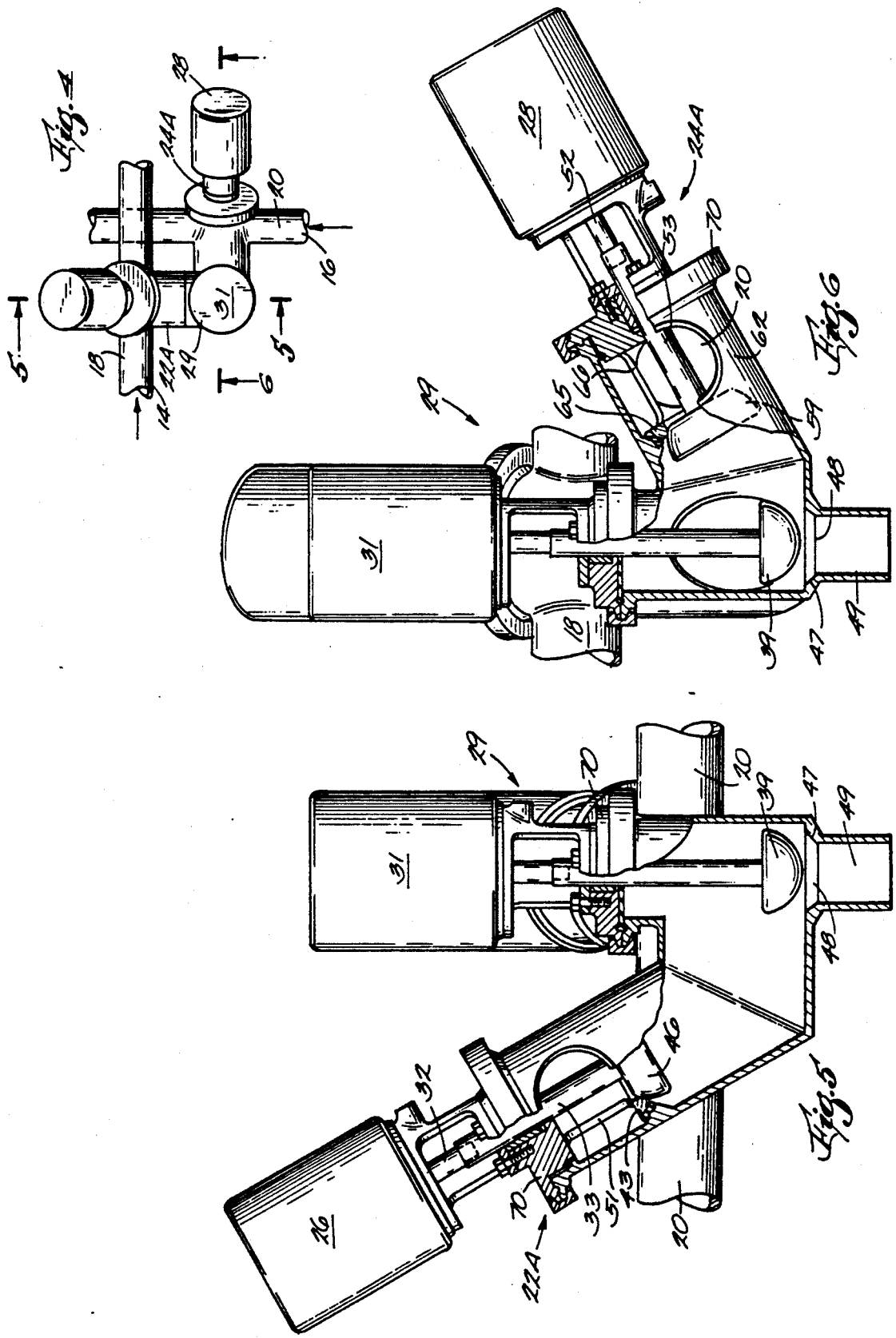

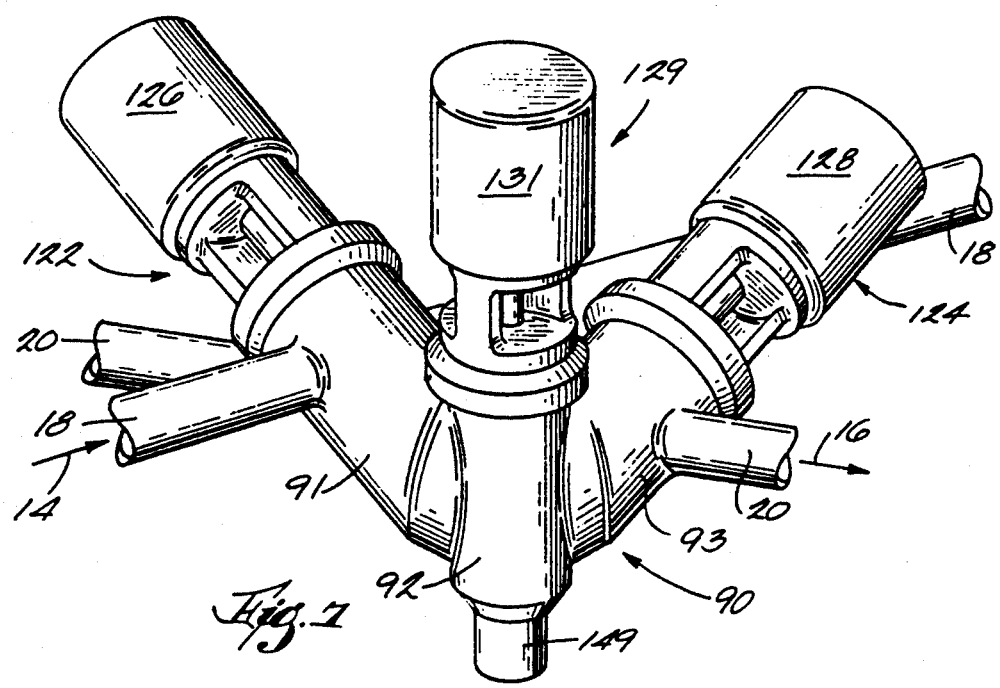
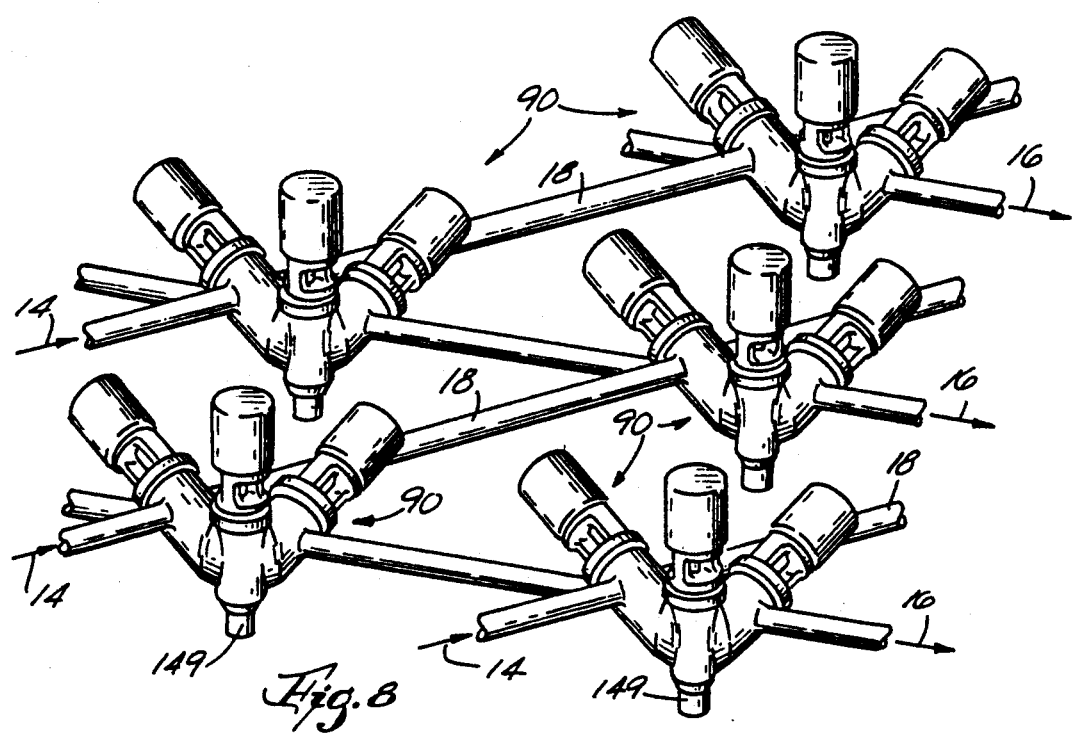

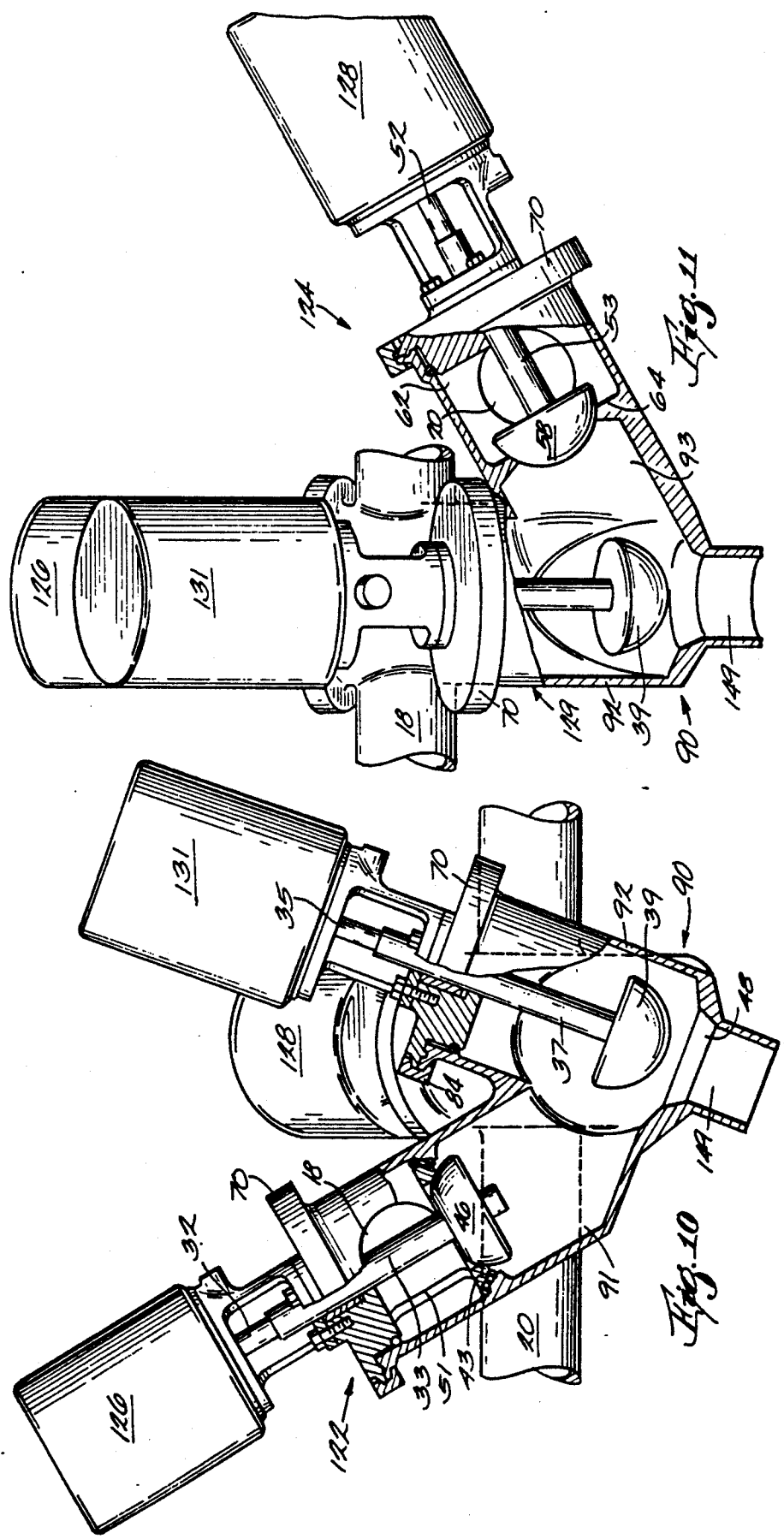

MANIFOLDS AND COMPOUND VALVES WITH REMOVABLE VALVE ASSEMBLIES

BACKGROUND OF THE INVENTION

This invention relates to valves for controlling the flow of fluids, and particularly to block-and-bleed valves assembled together to form manifolds for controlling the flow of fluids from multiple sources to multiple delivery destinations. Certain concerns unique to the sanitary food processing industry are discussed. The invention represents a further modification of the manifold systems disclosed in my co-pending U.S. patent application Ser. No. 07/918,238 filed Jul. 23, 1992.

It is common in the food packaging industry to have a need to connect a number of sources of a fluid, such as different types of milk or different types of soft drinks, to a number of different filler machines to fill containers, such as gallons, halfgallons, quarts and so on. To date these connections have been accomplished in the form of a manifold, including a number of lines from the source tanks crossing a number of lines leading to the filler machines, with the valves being provided to permit or prevent flow of fluid from any selected one or more of the source tanks to any chosen one or more of the filler machines. This arrangement creates a need for an extremely large number of valves, however. For instance, a single manifold connecting ten source tanks to ten filler machines, would use over a hundred valves to accomplish the control which is necessary and desired.

In the past, it has been conventional to use specially designed valves to control these manifolds, called block-and-bleed valves, sometimes called leak detector valves, with one such valve installed at each manifold intersection. Block-and-bleed valves are particularly applicable to the sanitary industry, because they permit control of flow of different types of fluids through the same valve with double protection against intermixing of those fluids. That is, it may be desirable to have chocolate milk flowing through one part of the valve and white milk through another part, or pasteurized milk through one part and raw milk through another part, or clean-in-place solution through one part and milk or another food fluid through another part. Clearly, it is critical that these fluids not be permitted to mix, and regulations require that even failure of a single seat or valve plug not permit such mixing.

While valves used in the past functioned generally satisfactorily, they were extremely complex and expensive, and included multiple, coaxial, independently operable actuators and valve plugs. Under certain circumstances these valves were subject to substantial leakage and product waste, and when they did fail in this manner, while preventing mix of different fluids, their maintenance was difficult and expensive.

This invention relates to improvements to the apparatus described above, and to solutions to some of the problems raised or not solved thereby.

SUMMARY OF THE INVENTION

The present invention includes a manifold valve assembly, that enables the use of three simple valves, individually controllable and removable, to control the flow of fluids at each intersection in a manifold. In accordance with one aspect of the invention, a compound valve is provided that is formed of a single valve body having three valve chambers and supporting three valve mechanisms. Each chamber has at least one inlet port and a plurality of outlet ports. A plurality of the valve bodies are connected together in fluid communication with each other. The valve mechanisms associated with each valve chamber each include separate actuator assemblies. Each assembly includes a valve actuator and an actuator rod attached to and actuatable by the actuator. A bonnet is affixed to each actuator, insertable into the respective chamber of the valve body. Thus each assembly can be individually removed and replaced. A valve stem is attached to the projecting end of the actuator rod, with plugs on the opposite side of the bonnet from the actuator. The bonnet, in one embodiment, includes a valve seat for engagement with one of the valve plugs when that valve plug is actuated to a predetermined position by the actuator.

In accordance with a further embodiment, two of the valves are combined in a single valve housing while a third valve is connected thereto by a short connecting conduit. The invention also provides for independent control of a normally open drain port that serves as a leak detector. The invention contemplates using three inexpensive single-actuator valves combined together in a single sub-assembly to provide a substantially less expensive but more effective valve assembly than that of the prior art. An important advantage of the present invention results from the fact that independent control of the three independently controllable valves enables closing of the leak detector port prior to opening of the other two control valves. Thus, no loss of fluid occurs when the valves are in motion.

The valves of this invention are particularly effective in preventing the inadvertent mixing of different types of fluids, even on failure of one valve seat or valve plug. An important advantage of the present invention is the reduction in the amount of fluid that is wasted when the fluid flow is diverted from one flow path to another. This reduction is achieved due to the fact that the volume of the passageways and chambers interconnecting the flow paths is greatly reduced.

The structure of the present invention replaces a single, expensive, multiple-actuator valve with three simpler, inexpensive single-actuator valves which together are less expensive than the valves they replace. It is not uncommon for the single valve of the prior art to be three or more times as expensive as one of the simple valves provided by the present invention. Accordingly, the present invention provides a cost effective configuration that achieves operational economies superior to valves heretofore available, especially with respect to a reduction of waste discharged through the leak detection port.

An important advantage of the invention relates to the provision of an economical valve assembly that provides a leak detector or opening to the atmosphere that complies with applicable regulations governing equipment used in the dairy industry. Particularly, provision is made for controllable separation of food processing circuits from cleaning circuits. In accordance with the invention, such separation is provided by two automatically controlled valves with a drainable opening to the atmosphere between the valves. The opening to the atmosphere is made at least equal to the line size of the takeoff valve. In accordance with a related aspect, the system of this invention is readily provided with an automatic fail safe system to prevent product contamination with cleaner and/or sanitizing solutions.

In accordance with an important related aspect of the invention, cleaning of the valve assembly is facilitated by the fact that, unlike prior art valve assemblies, each valve in the assembly can be fully and adequately cleaned by virtue of the fact that each valve stem in the system can be fully extended and retracted for purposes of cleaning. This assures adequate cleaning of the valve parts and associated O-rings or similar seals.

Other objects and advantages of the invention will become apparent hereinafter.

DESCRIPTION OF THE DRAWINGS

FIG. 1 is a perspective view of a fragmentary portion of a manifold assembly employing manifold valve assemblies constructed according to one embodiment of the invention.

FIG. 2 is an elevational cross sectional view taken along line 2—2 of FIG. 1.

FIG. 3 is a side elevational cross sectional view of the manifold valve assembly shown in FIG. 1 taken along line 3—3.

FIG. 4 is a perspective view of a fragmentary portion of a manifold assembly employing manifold valve assemblies constructed according to another embodiment of the invention.

FIG. 5 is an elevational cross sectional view taken along line 5—5 of FIG. 4.

FIG. 6 is a side elevational cross sectional view of the manifold valve assembly shown in FIG. 4 taken along line 6—6.

FIG. 7 is a perspective view of a valve assembly constructed according to yet another alternative embodiment of the invention with fragmentary input and delivery tubes connected thereto.

FIG. 8 is a perspective view of a fragmentary portion of a manifold assembly employing manifold valve assemblies constructed according to the embodiment of FIG. 7.

FIG. 10 is a side elevational cross sectional view of the manifold valve assembly shown in FIG. 9 taken along line 10—10.

FIG. 11 is a side elevational view, partially in section, taken along line 11—11 of FIG. 9.

DESCRIPTION O THE PREFERRED EMBODIMENT

Figure 9:
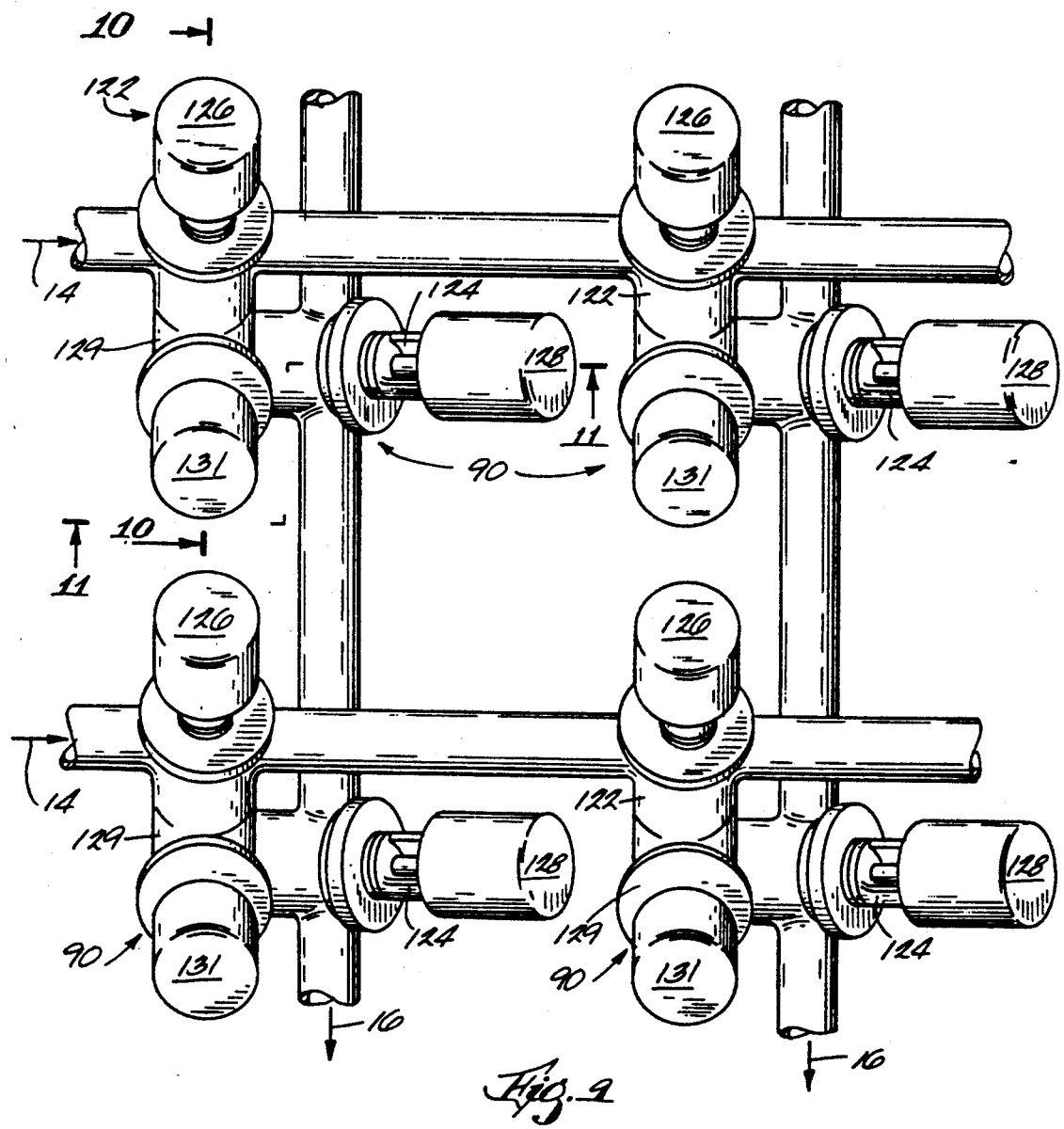
FIG. 9 is a top, partially cut away, of a manifold valve assembly constructed to the embodiment of FIG. 7.

Referring now to FIG. 1, there is shown a manifold assembly 10, employing a number of manifold valve assemblies 12 constructed according to one embodiment of the invention. As there shown, the manifold assembly 10 is connected to and receives supply from a number of sources 14, such as tanks of fluid. The manifold assembly 10 is also connected to and supplies the fluid to a number of destinations 16, such as filler machines for filling containers with one or more of the fluids from the fluid supply tanks. The purpose of the manifold assembly 10 is to control and selectively permit the flow of fluid from one or more predetermined sources 14 to a predetermined destination 16. The manifold assembly includes one supply tube 18 for each fluid supply source 14, and one delivery tube 20 for destination 16. While the manifold assembly 10 shown in FIG. 1 is fragmentary, it will be understood that the invention may be applied to any number of fluid supplies and destinations.

As can be seen from FIG. 1, this manifold assembly results in a crossed pattern of supply tubes 18 and delivery tubes 20. The supply tubes 18 and delivery tubes 20 do not actually intersect, but rather are positioned parallel in sets, in parallel planes, with either one set or the other being in the upper plane, the opposite set being in the lower plane. According to the embodiment of the invention shown in the drawing figures, the delivery tubes 20 are positioned in a plane beneath the plane of the supply tubes 18, but it could just as easily be the other way around. One manifold valve assembly 12 is provided at each crossing point of a supply tube 18 with a delivery tube 20.

As shown best in FIGS. 2 and 3, each manifold valve assembly 12 includes in effect three separate valve bodies, a supply valve body 22 a delivery valve body 24 and a crossover or "leak detector" valve body 29. Each of these valve bodies 22, 24 and 29 is supplied with its own actuator assembly 26, 28 and 30, respectively. As shown in FIGS. 2 and 3, valve bodies 22 and 29 are connected by a short crossover tube 30. Valve bodies 24 and 29 are connected to each other at their lower end by means of an interconnected valve housing.

As can best be seen in FIG. 2 crossover tube 30 is connected to the bottom of valve body 29. Also, because the supply tubes 18 are positioned in a plane higher than that of the delivery tubes 20, the supply valve body 22 is higher than the delivery valve body 24.

The interior detail of each valve body can been seen by reference to FIGS. 2 and 3. FIG. 2 shows the detail of the supply valve body 22, while FIG. 3 shows the detail of delivery valve body 24. Reference will first be had to the detail of valve body 22, and this detail will later be related to the detail of the valve body 24.

As indicated above, referring particularly to FIG. 2, supply valve body 22 includes its own actuator 26, having an actuator rod 32, actuatable between two positions. Valve body 22 has, at its top, a passthrough section including an inlet 36 substantially aligned with an outlet 38. Relating FIG. 2 with FIG. 1, the inlet 36 and outlet 38 of the supply valve body 22 connect to and in effect form part of one of the supply tubes 18, permitting flow of fluid from upstream destination valves at all times regardless of whether valve 22 is open or closed.

A valve plug 40 is attached to the end of valve stem 33 which is in turn attached to actuator rod 32. Plug 40 is provided to close a port 42 at the bottom of valve cavity 44. The perimeter of port 42 is defined by a valve seat 45. The actuator 26 has two positions, one where port 42 is open so that fluid can flow into tube 30, and the other where port 42 is closed.

As also indicated above, referring now mainly to FIG. 3, delivery valve body 24 has its own actuator 28. As with supply valve body 22, again actuator 28 has an actuator rod 52, actuatable between two positions. Delivery valve body 24 has a pass-through section including an inlet 54 substantially aligned with an outlet 56. Relating FIG. 3 with FIG. 1, the inlet 54 and outlet 56 of the delivery valve body 24 connect to and in effect form part of one of the delivery tubes 20, permitting free flow of fluid to downstream delivery valves at all times regardless of the position of the valve 24.

As with supply valve body 22, actuator rod 52 has affixed thereto a valve stem 53, by any suitable removable means, such as by threading. A valve plug 58 is affixed to or integrally formed with the valve stem 53. Once the valve stem 53 is assembled to the actuator rod, plug 58 is positioned within a valve cavity 62 of the delivery valve body 24. As was the case with supply actuator 26, delivery actuator 28 has two positions, one where port 64 is open and the other where port 64 is closed.

Control of the two actuators 26 and 28 is coordinated so that when supply valve 22 is open delivery valve body 24 is also open and valve 29 is closed. Fluid then flows from supply tube 18 into supply valve 22, through crossover tube 32, into delivery valve 24 and finally into delivery tube 20. However, for cleaning, valves 22 and 29 could be open and valve 24 closed so that the supply side is cleaned without affecting the delivery side, or vice versa.

The invention calls for structure permitting easy removal of the actuator and valve stem from any one of the valves at any time. Using a supply valve body 22 as an example, the body 22 is formed by the assembly of a valve bonnet 70 into a valve body proper 44, the latter having substantially all the ports 42, 36, 38 referred to above.

To assemble valve 22, valve stem 33 is inserted upward through an opening 78 in the bonnet 70 and attached to actuator rod 32. The actuator 26, with the valve stem 33 attached to its actuator rod 32, is then affixed to a flat top surface 74 of the bonnet by any suitable removable means, such as threaded fasteners 76. The bonnet 70 has a flange 80 which flares outward from the central opening, to fit onto a mating flange surface 82 of the body proper 44. Upon assembly the two flanges are clamped together by a suitable clamp 84 (FIG. 4). A sealing means, such as an O-ring can be provided to ensure against leakage.

Once valve stem 33 is inserted through opening 78 in bonnet 70 and attached to actuator rod 32, the entire assemblage is then inserted into the body proper 44 and clamped therein. Just as easily, if the actuator 26 requires service, or if the valve plug 40 needs replacing or other service, the clamp 84 is opened and the actuator and bonnet 70 removed.

It is not unusual for the delivery tubes 16 to be smaller in size than the supply tubes 14, such as 2 inch delivery tubes being used with 3 inch supply tubes. In order to satisfy sanitary requirements, it is necessary that the total drain opening area of the manifold valve assembly 12 is at least as large as the smaller of the supply tubes 14 or the delivery tubes 16.

Valves 24 and 29 are constructed with bonnets similar to that described for valve 22. As seen in FIGS. 2 and 3, valve 29 is also a simple actuator type valve. Actuator 31 operates in actuator rod 35 which is connected to a valve stem 37. A valve plug 39 is affixed to or integrally formed with valve stem 37. Valve plug 39 is adapted to fit into and close a valve seat 47 which defines a port 48 at the bottom of the housing of valve 29 so as to close a drain port 49.

Referring to FIGS. 4, 5 and 6, there are seen alternative supply and delivery valves 22a and 24a, respectively. In this embodiment supply valve 22a is also controlled by actuator rod 32 to which a valve stem 33 is connected. Valve plug 46, however, closes valve seat 43 by moving upward and is seen in FIG. 5 and is opened by moving downward. Similarly, delivery valve 24a is driven by actuator rod 52 driven by actuator 28. A valve stem 53 is connected to actuator rod 52 and has attached to the end thereof valve plug 59 adapted to close a valve seat 65 by moving upwardly as seen in FIG. 6. In this embodiment the valve 29 is the same as shown in FIGS. 2 and 3.

In the embodiment of FIGS. 4-6 valve seats 43 and 65 are integral with a cage type structure 51 and 66, respectively. Cages 51 and 66 are formed with openings so as not to impede the flow of fluids through their respective pass-through channels, thereby permitting free flow of fluids through tubes 18 and 20.

In addition to the specific configurations of valves shown in FIGS. 1-3 and 4-6, other combinations can be used as desired. Specifically, a valve 22A could be used in combination with valves 29 and valve 24. This combination of valves would have the advantage that each of valves would close against the flowing fluid thus avoiding hammering of the valves during closure.

Referring now to the embodiment of FIGS. 7-11, which show a particularly preferred embodiment of the invention, there is seen in FIG. 8 a manifold assembly comprising a plurality of compound valve housings 90. A similar manifold is shown from the top in FIG. 9.

Each compound valve 90 is formed of a single valve housing that contains three separate valve chambers or cylinders 91, 92 and 93. Supply tubes 18 are connected to chamber 91 which is controlled by a supply valve assembly 122 operated by its own actuator 126. Delivery tubes 20 are connected to valve chamber 93 which is controlled by a delivery valve assembly 124 operated by actuator 128. Intermediate or leak detector valve assembly 129 is fitted in the third cylinder 92 and is operated by actuator 131 to open and close a drain or leak detector port 149.

The embodiment shown in FIGS. 7-11 utilizes the same arrangement for attachment of the valve bonnet and other operational details. These are therefore not repeated herein. It will be noted that by use of a single valve housing with three cylinders, the volume of fluids between the individual valves is minimized. Thus a great reduction of waste is achieved, particularly over a period of time. Cleaning of either the supply side or distribution side of the assembly while maintaining separation of the opposite side is also facilitated. It will also be noted that both of the valves 122 and 124 close in a direction counter to the flow of fluids through the valve assembly thus avoiding shock or hammering of the valves during closure.

Note that, in operation, port 149 can be closed by means of valve seat 39 prior to opening of ports 43 and 64. Thus no waste of fluid occurs when the valves are in motion.

It will be noted that each embodiment of the invention enables use of three simple single actuator valves to perform fluid flow control operations that previously required costly and complex valves. Use of these valves in accordance with the invention still prevents the mixing of different types of fluids running through the same valve assembly, even on failure of one valve seat or valve plug.

While the apparatus hereinbefore described is effectively adapted to fulfill the aforesaid objects, it is to be understood that the invention is not intended to be limited to the specific preferred embodiment of manifold valve assembly with removable valve seat set forth above. Rather, it is to be taken as including all reasonable equivalents within the scope of the following claims.

I claim:

1. A manifold assembly, comprising:

a plurality of manifold valve assemblies each including three single actuator valves, each having at least one inlet port and one outlet port; each of said valves including a valve actuator, an actuator rod attached to and actuatable by said actuator, one end of said rod projecting outward from said actuator, and at least one valve plug attached to the projecting end of said actuator rod;

means for connecting an inlet port of a first one of the valves in each of said manifold valve assemblies to a supply source and an outlet port of said valve to an inlet port of a second one of said valves;

means for connecting an outlet port of said second valve to an inlet port of a third one of said valves; and means for connecting an outlet port of said third valve to a delivery outlet.

2. A manifold assembly as recited in claim 1 wherein the cylinders of each of said first and third valves include a pass-through channel not controlled by a valve plug.

3. A manifold assembly according to claim 1 wherein each of said valves includes a bonnet affixed to said actuator, said bonnet being insertable into one of said valve bodies and carrying said valve stem and plug whereby each of said valves can independently be removed from said assembly.

4. A manifold assembly as recited in claim 3 wherein said bonnet includes a cage portion positioned in said pass-through area, so as to continuously permit flow through the bonnet, said cage portion supporting a valve seat fitted to said valve plug.

5. A manifold assembly as recited in claim 3 further comprising sealing means positioned between said bonnet and said valve body.

6. A manifold assembly as recited in claim 1 wherein at least two of said valves are positioned in valve cylinders defined by a single housing, said cylinders inters being interconnected in fluid flow communication with each other at their base ends opposite their respective actuators.

7. A manifold assembly as recited in claim 6 wherein all three of said cylinders are defined by a single housing and are in fluid flow communication with each other at their base ends.

8. A manifold assembly as recited in claim 6 wherein two of said valve bodies are defined by a single housing, and wherein said valve bodies are connected in fluid communication by means of a crossover tube to the third valve body.

* * * * *